Patented Nov. 8, 1949

2,487,383

UNITED STATES PATENT OFFICE 2,487,383

UREA DERIVATIVES AND PROCESS OF MAKING SAME

Richard Sallmann, Gelterkinden, Switzerland, assignor to Ciba Limited, Basel, Switzerland No Drawing. Application April 5, 1946, Serial No. 659,862. In Switzerland April 18, 1945

11 Claims. (Cl. 260—404.5)

According to this invention new urea derivatives are made by converting a condensation product of an amide with formaldehyde and a urea compound containing the atomic grouping —NH—CO—NH—, or a methylene compound obtainable from such a condensation product by condensation with formaldehyde in the presence of an acid, into a formaldehyde derivative containing at least one $$-CO-N-CH_2-OH$$

or $$-CO-N-CH_2-halogen$$

group, and, if desired, exchanging the hydroxyl group of at least one $$-CO-N-CH_2-OH$$

group or the halogen atom of at least one $$-CO-N-CH_2-halogen$$

group for a radical imparting solubility in water.

The introduction of the radical imparting solubility in water may be carried out in a single stage, instead of in two stages, by condensing the condensation product used as starting material, or the methylene compound thereof, with formaldehyde and a suitable compound enabling the radical imparting solubility in water to be introduced.

The condensation products of amides, such as acetamide, caprylic acid amide, lauric acid amide or stearic acid amide, with formaldehyde and urea compounds containing the atomic grouping —NH—CO—NH—, particularly products of the formula $$R-C\underset{NH-CH_2-NH-\underset{\|}{C}-NH_2}{\overset{O}{\diagup}}$$

$$\left( R-C\overset{O}{\diagup} \right)$$

represents the acyl radical of a carboxylic acid with at least 2 carbon atoms), can be obtained, for example, by the process of French specification No. 858,510, which also describes further condensation products which can be used as starting materials for the present process. Thus, for example, the amide or the urea compound may be converted into an N-methylol compound by treatment with formaldehyde, and the third component caused to act on the N-methylol compound in presence of an acid, and advantageously in the presence of a solvent, for example, by the use of concentrated sulfuric acid serving both as a solvent and a condensing agent. As urea compounds containing the atomic grouping $$-NH-CO-NH-$$

there may be used in this condensation, besides urea itself, mono- or di-substitution products thereof, for example, monomethyl-urea, or also biuret.

The methylene compounds also coming into consideration as starting materials for the present process, and which are derived from the condensation products described in the preceding paragraph, can be obtained from these condensation products by condensation with formaldehyde in the presence of an acid, for example, with the addition of sulfuric acid, and advantageously by heating for a short time at the boil a solution of the starting material in glacial acetic acid with the addition of a small quantity of concentrated sulfuric acid.

The conversion of a $$-\underset{\|}{C}-NH-CH_2-NH-\underset{\|}{C}-NH_2$$
$$\phantom{-}O\phantom{-NH-CH_2-NH-}O$$

group into a $$-\underset{\|}{C}-NH-CH_2-NH-\underset{\|}{C}-NH-CH_2-OH$$
$$\phantom{-}O\phantom{-NH-CH_2-NH-}O$$

group may be brought about, for example, by heating a condensation product from an amide, formaldehyde and urea with formaldehyde with the addition of a substance of alkaline reaction, for example, in the presence of triethylamine.

For the introduction of at least one $$-CO-N-CH_2-halogen$$

group the starting material may be treated, for example, at 50–60° C., with formaldehyde and a hydrogen halide, advantageously in the presence of a water-insoluble inert solvent such as benzene. 1 molecular proportion of formaldehyde may be used for every amide-hydrogen atom. Instead of formaldehyde and a hydrogen halide there may be used an α:α'-dihalogendimethyl ether, for example, α:α'-dichlorodimethyl ether. For this purpose the starting material may be heated with the α:α'-dihalogendimethyl ether, for example at 90–100° C., until hydrogen halide ceases to be split off. For this reaction it is not necessary to use a solvent. By the action of formaldehyde and a hydrogen halide or of an α:α'-dihalogendimethyl ether on a starting material containing an atomic grouping $$-CO-NH-CH_2-NH-CO-NH_2$$

a methylene compound is first formed, which is then converted by further reaction with the said agent into an N-halogenmethyl compound.

The N-methylol compounds and N-halogen methyl compounds obtainable by the invention are very reactive owing to the presence of a

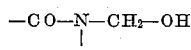

or

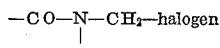

group, and are therefore valuable intermediate products. Water-soluble final products can be obtained from these intermediate products, for example, as follows:

Products, which at least in the form of their alkali salts are soluble in water, are also formed by causing the N-halogen-methyl compounds of the invention to react with hydroxy-carboxylic acids or hydroxy-sulfonic acids, for example, with glycolic acid or β-hydroxyethanesulfonic acid, or alternatively with mercapto-carboxylic acids or mercapto-sulfonic acids, such as thioglycolic acid, for example, in the presence of a solvent such as acetone, and advantageously at 50–70° C. Instead of hydroxy-carboxylic acids, glycols or ethers thereof, especially polyglycols, may be used for the reaction. For this purpose the N-halogen methyl compounds of the invention are heated with the glycols or their ethers, advantageously at about 100–130° C., until no more hydrogen halide is split off.

It is also possible by reacting with salts of halogen-carboxylic acids to exchange the reactive halogen atoms for ester-like radicals corresponding to the halogen-carboxylic acids used, groups imparting solubility in water being introduced into the said radicals.

For converting the N-methylol compounds of the invention into water-soluble derivatives the said compounds may be caused to react, for example, with hydroxy- or mercapto-carboxylic acids, such as glycolic acid or thioglycolic acid, in the presence of a catalyst, particularly of an acid and advantageously with the addition of a solvent. The introduction of neutral or acid water solubility imparting groups presents certain advantages as compared to the introduction of basic groups in that products are obtained which—in contradistinction to cation-active compounds—cause no precipitation with acid dyestuffs and which have no unfavorable influence on the light fastness of dyeings. Products of the invention which contain as water solubility imparting groups radicals of hydroxy- or mercapto-acids, for example of hydroxy-carboxylic acids, hydroxy-sulfonic acids, mercapto carboxylic acids or mercapto-sulfonic acids, also radicals of polyglycols, for instance, diethyleneglycol, triethyleneglycol or of polyglycols of still higher molecular weight are noted for the ease with which they can be obtained. Products of this kind can contain, for instance, the following atom groupings which impart solubility in water

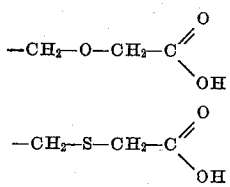

or

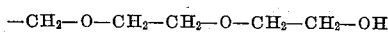

In case of acid groups the solubility in water is caused at least by their alkali salts.

The present invention thus embraces the process for the manufacture of a urea derivative which comprises condensing a formaldehyde derivative selected from the group consisting of N-methylol compounds of substituted ureas of the formula

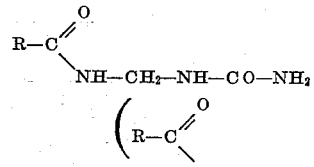

being the acyl radical of a carboxylic acid with at least 2 carbon atoms), N-methylol compounds of substituted ureas of the aforesaid formula in which compounds a methylene bridge replaces one amide-hydrogen atom of each of two substituted urea molecules of the aforesaid formula, and N-chloromethyl compounds of substituted ureas of the aforesaid formula in which compounds a methylene bridge replaces one amide-hydrogen atom of each of two substituted urea molecules of the aforesaid formula, with a solubilizing agent of the formula H—$x$—R, wherein $x$ is a member selected from the group consisting of oxygen and sulfur and R is a carbon chain of at least two carbon atoms containing a water-solubilizing group, an acid being added in case no hydrogen halide is split off in the condensation process.

Substituted ureas of the formula

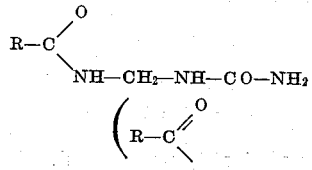

being the acyl radical of a carboxylic acid with at least 2 carbon atoms), in which ureas a methylene bridge replaces one amide-hydrogen atom of each of two substituted urea molecules of the aforesaid formula are, for instance, products of the formula

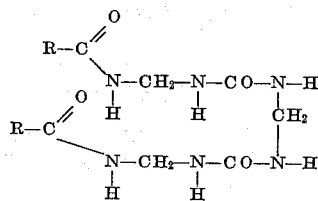

wherein

has the meaning given above. Products described in the preceding two sentences may also be designated as methylene compounds containing at least twice the atomic grouping

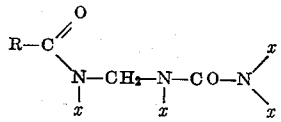

wherein

is the acyl radical of a carboxylic acid with at least 2 carbon atoms, a methylene bridge —$CH_2$— substituting one $x$ of each of two atomic groupings of the formula given above and connecting in this way two atomic groupings with one another, the remaining $x$-groups being hydrogen. This type of description may be used to designate the above mentioned N-chloromethyl compounds in the following manner; methylene compounds containing at least twice the atomic grouping

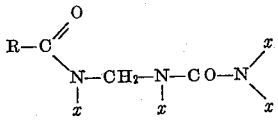

wherein

has the meaning given above, and wherein at least one $x$ represents —$CH_2$—Cl, a methylene bridge —$CH_2$— replacing one $x$ of each of two atomic groupings of the formula given above and connecting in this way two atomic groupings with one another, the remaining $x$-groups being hydrogen. The corresponding N-methylol compounds may be defined in a similar manner by substituting —$CH_2$—OH for —$CH_2$—Cl.

The above mentioned methylolamides and methyl chloride compounds are closely related substances. All are formaldehyde compounds with comparatively loosely bound formaldehyde which, consequently, can easily be split off. A common property of all of these formaldehyde derivatives is their easy decomposition.

There is also close relationship between the substituted ureas of the formula

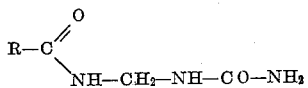

and the methylene compounds derived therefrom, that is to say, wherein a methylene bridge links two radicals derived from the indicated formula (as, for example, in the case of the compound of the formula

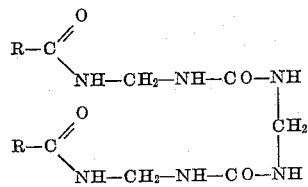

This becomes manifest by the incapability of, for instance, the compound

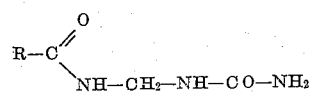

of being converted into a methyl chloride compound and by their being converted first into the methylene compound just mentioned when treated with, for instance, formaldehyde and hydrochloric acid; such methylene compound can then be converted into a methyl chloride compound.

Among the compounds of the above mentioned formula H—$x$—R wherein $x$ is a member selected from the group consisting of oxygen and sulfur and R is a carbon chain of at least two carbon atoms containing a water-solubilizing group, there are of prime importance the hydroxy acids, mercapto acids and polyglycols. The water-solubility of these compounds is known to be caused by the presence of several oxygen atoms which is common to all of them.

For the purpose of introducing a group imparting solubility in water in a single stage instead of the two stages, as hereinbefore referred to, there may be used as compounds which enable a group imparting solubility in water to be introduced, for example, hydroxy-carboxylic acids, or mercapto-carboxylic acids. For this purpose the reaction components are heated, advantageously with the addition of a solvent, such as glacial acetic acid. A product obtainable by the present process can be defined as a methylene compound containing at least twice the atomic grouping

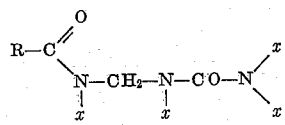

wherein

is the acyl radical of a carboxylic acid with at least 2 carbon atoms and wherein at least one $x$ represents —$CH_2$—$y$—$R_1$ ($y$ being a member selected from the group consisting of oxygen and sulfur, $R_1$ being a carbon chain of at least two carbon atoms containing a water-solubilizing group), a methylene bridge —$CH_2$— replacing one $x$ of each of two atomic groupings of the formula given above and connecting in this way two atomic groupings with one another, the remaining $x$-groups being hydrogen, which compound is decomposed by boiling with dilute hydrochloric acid.

The products obtainable by the invention may be used, depending on the choice of the starting materials, inter alia, as assistants, for example in the textile, leather and paper industries. The water-soluble products which contain an aliphatic or cyclo-aliphatic radical of high molecular weight, more particularly such a radical having 12 carbon atoms, are especially suitable, for example, as wetting or softening agents, or as agents for rendering textiles water-repellent, a subsequent heat treatment being advantageously applied in the latter case. The aforesaid agents may be used alone or in conjunction with other substances customarily employed in conjunction with textile assistants, for example, salts of weak acids. For the purpose of rendering textiles water-repellent there are especially suitable the water-soluble products of the invention which contain at least one saturated aliphatic radical having about 18 carbon atoms.

The following examples illustrate the invention, the parts being by weight unless otherwise stated and the relationship of parts by weight to parts by volume being the same as that of the kilogram to the liter:

*Example I*

35.5 parts of the condensation product from stearic acid methylolamide and urea, which has the formula

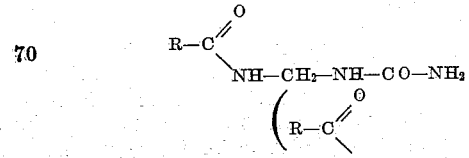

being the acyl radical of commercial stearic acid)

and which may be obtained, for example, by the process of French specification No. 858,510, are dissolved in 350 parts of glacial acetic acid. 1.7 parts of paraformaldehyde are first introduced while stirring. Then 5 parts of concentrated sulfuric acid are added and the clear solution is heated at the boil in a reflux apparatus for 90 minutes. The reaction product, which is a methylene compound of the probable formula

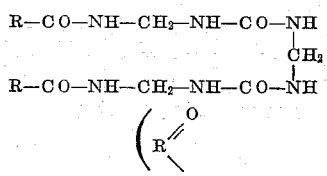

being the acyl radical of commercial stearic acid) may be isolated in the form of a yellowish colored powder by introducing the reaction mixture into water. There is no doubt as to this powder being a methylene compound of a substituted urea. However, there is no absolute certainty as to which amide hydrogen atoms of a urea molecule of the formula

R—CO—NH—CH$_2$—NH—CO—NH$_2$ are replaced by the methylene bridge. The methylene compound obtainable by the above process may as well be described as a methylene compound containing twice the atomic grouping

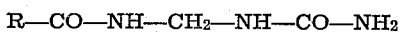

wherein

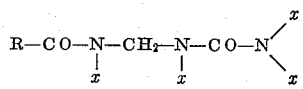

is the acyl radical of commercial stearic acid, a methylene bridge —CH$_2$— replacing one $x$ of each of two atomic groupings of the formula given above and connecting in this way two atomic groupings with one another, the remaining $x$-groups being hydrogen.

Compounds of the formula

C$_5$H$_{11}$—CO—NH—CH$_2$—NH—CO—NH$_2$ or

C$_{11}$H$_{23}$—CO—NH—CH$_2$—NH—CO—NH$_2$ can in the same manner be converted into methylene compounds of the probable formula

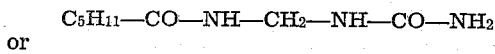

or

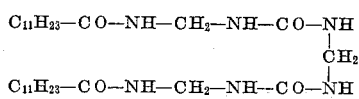

Example II 14.4 parts of the methylene compound obtained as described in the first paragraph of Example I are dissolved in 300 parts of benzene. After the addition of 4 parts of paraformaldehyde, dry hydrogen chloride gas is introduced, while stirring, for 1 hour at 50–60° C. The supernatant liquid is poured off from the water which settles to the bottom, the benzene solution is dried with calcium chloride, and the benzene is removed by distillation in vacuo at 50° C. The residue is a chloromethyl derivative of the starting material. This is the chloromethyl derivative referred to in Examples III and IV.

The methylene compounds with the radicals

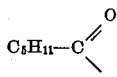

or

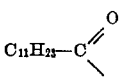

mentioned in Example I can in the same manner be converted into the corresponding chloromethyl compounds.

Example III 3 parts of the chloromethyl derivative obtained as described in Example II are heated with 3 parts of diethyleneglycol for 10 minutes at 120–130° C. At the end of this period the evolution of hydrogen chloride gas, which is at first brisk, ceases. A brownish colored wax-like mass is obtained, which after neutralization of the adherent hydrogen chloride dissolves in water to form an opalescent solution. Aqueous solutions of the product foam, and decompose upon being heated with an acid for a short time with the loss of the foaming property. It is a methylene compound containing at least twice the atomic grouping

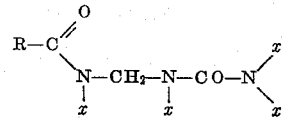

wherein

is the acyl radical of technical stearic acid and wherein at least one $x$ represents

—CH$_2$—O—CH$_2$—CH$_2$—O—CH$_2$—CH$_2$—OH a methylene bridge —CH$_2$— replacing one $x$ of each of two atomic groupings of the formula given above and connecting in this way two atomic groupings with one another, the remaining $x$-being hydrogen.

Example IV 3 parts of the chloromethyl derivative obtained as described in Example II are dissolved together with 3.3 parts of glycolic acid in 10 parts of acetone, and the whole is boiled in a reflux apparatus for 30 minutes. After removing the acetone by distillation, a yellowish colored mass remains behind. By dissolving the latter in sodium carbonate solution the sodium salt is obtained, which after evaporation in vacuo is a yellowish colored powder which is easily soluble in water. It is a methylene compound containing at least twice the atomic grouping

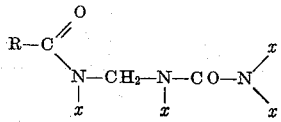

wherein

is the acyl radical of technical stearic acid and wherein at least one $x$ represents

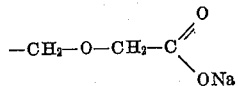

a methylene bridge —CH$_2$ replacing one $x$ of each of two atomic groupings of the formula given above and connecting in this way two atomic groupings with one another, the remaining $x$-groups being hydrogen.

The chloromethyl compounds with the radicals

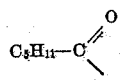

or

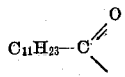

mentioned in Example II can in the same manner be converted into glycolic acid derivatives.

Example V 2.16 parts of the methylene compound obtained as described in the first paragraph of Example I are dissolved in 20 parts of benzene. 0.6 part of paraformaldehyde and 1.8 parts of thioglycolic acid are added while stirring. After boiling the whole in a reflux apparatus for 30 minutes a test portion will dissolve to give a clear solution in a dilute solution of sodium carbonate. After removing the benzene by distillation in vacuo, the reaction product is obtained in the form of a solid mass. By dissolving the latter in a dilute sodium carbonate solution and evaporating in vacuo, the sodium salt can be obtained in the form of a white powder. It is a methylene compound containing at least twice the atomic grouping

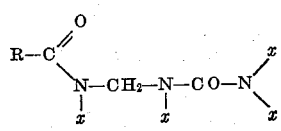

wherein

is the acyl radical of technical stearic acid and wherein at least one $x$ represents

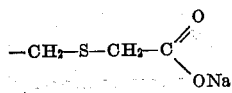

a methylene bridge —CH$_2$— replacing one $x$ of each of two atomic groupings of the formula given above and connecting in this way two atomic groupings with one another, the remaining $x$-groups being hydrogen.

Example VI 3.6 parts of the condensation product from stearic acid methylolamide and urea are dissolved in 5 parts of pyridine, and heated with 0.4 part of paraformaldehyde for 1 hour, while stirring, on the steam bath. After removing the pyridine by distillation in vacuo, the resulting methylol compound is dissolved in 20 parts of acetic acid. An excess of thioglycolic acid is added and the whole is heated to 90–95° C. until a test portion is soluble in dilute caustic soda solution. The condensation product, when freed from solvent and neutralized, can be used as a textile auxiliary.

Example VII

A textile is rendered water-repellent in the following manner: 20 parts of the sodium salt described in the first paragraph of Example IV and 50 parts of an ammonium formate solution of about 10 per cent. strength are dissolved in 1000 parts of water and 100 parts of a cotton fabric (wind-proof jacket material) are treated for 10 minutes at 60° C. with the resulting solution. The fabric is squeezed and then dried at 60° C., and heated for 5 minutes at 140° C. The fabric so treated is water-repellent, and the dressing is not impaired to any considerable extent by washing.

What I claim is:

1. Process for the manufacture of a urea derivative which comprises condensing a N-chloromethyl compound of a substituted urea of the formula

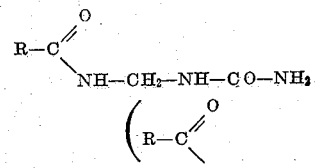

being the acyl radical of a fatty acid with at least 12 carbon atoms), in which compound a methylene bridge replaces one amide-hydrogen atom of each of two substituted urea molecules of the aforesaid formula, with a solubilizing agent of the formula H—$x$—R wherein $x$ is a member selected from the group consisting of oxygen and sulfur and R is a carbon chain of at least two carbon atoms containing an acid water-solubilizing group selected from the class consisting of —COOH and —SO$_3$H, by heating the participants of the condensation to a temperature lying above 50° C. but below the temperature of decomposition until the splitting off of hydrogen halide ceases.

2. Process for the manufacture of a urea derivative which comprises condensing a N-chloromethyl compound of a substituted urea of the formula

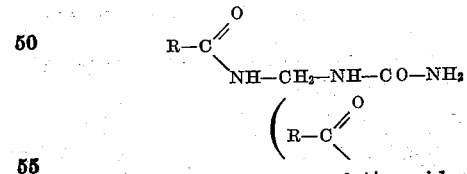

being the acyl radical of a fatty acid with at least 12 carbon atoms), in which compound a methylene bridge replaces one amide-hydrogen atom of each of two substituted urea molecules of the aforesaid formula with glycolic acid, by heating the participants of the condensation to a temperature lying above 50° C. but below the temperature of decomposition until the splitting off of hydrogen halide ceases.

3. Process for the manufacture of a urea derivative which comprises condensing a N-chloromethyl compound of a substituted urea of the formula

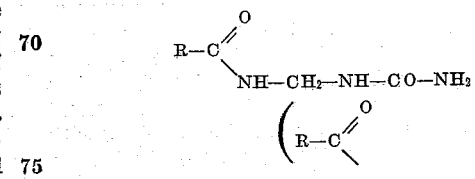

being the acyl radical of commercial stearic acid), in which compound a methylene bridge replaces one amide-hydrogen atom of each of two substituted urea molecules of the aforesaid formula with glycolic acid, by heating the participants of the condensation to a temperature lying above 50° C. but below the temperature of decomposition until the splitting off of hydrogen halide ceases.

4. Process for the manufacture of a urea derivative which comprises condensing a N-chloromethyl compound of a substituted urea of the formula

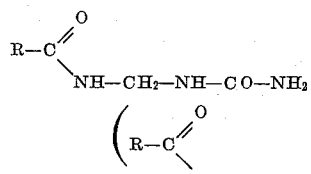

being the acyl radical of commercial stearic acid), in which compound a methylene bridge replaces one amide-hydrogen atom of each of two substituted urea molecules of the aforesaid formula with thioglycolic acid, by heating the participants of the condensation to a temperature lying above 50° C. but below the temperature of decomposition until the splitting off of hydrogen halide ceases.

5. Process for the manufacture of a urea derivative which comprises condensing a N-chloromethyl compound of a substituted urea of the formula

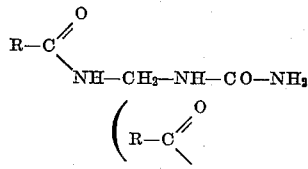

being the acyl radical of commercial stearic acid), in which compound a methylene bridge replaces one amide-hydrogen atom of each of two substituted urea molecules of the aforesaid formula with diethylene glycol, by heating the participants of the condensation to a temperature lying above 50° C. but below the temperature of decomposition until the splitting off of hydrogen halide ceases.

6. A methylene compound containing at least twice the atomic grouping

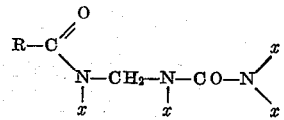

wherein

is the acyl radical of a carboxylic acid with at least 12 carbon atoms and wherein at least one $x$ represents $-CH_2-y-R_1$ ($y$ being a member selected from the group consisting of oxygen and sulfur, $R_1$ being a carbon chain of at least two carbon atoms containing an acid water-solubilizing group selected from the class consisting of $-COOH$ and $-SO_3H$), a methylene bridge $-CH_2-$ replacing one $x$ of each of two atomic groupings of the formula given above and connecting in this way two atomic groupings with one another, each remaining $x$ being hydrogen.

7. A methylene compound containing at least twice the atomic grouping

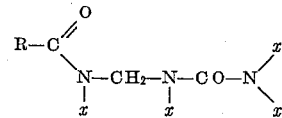

wherein

is the acyl radical of a fatty acid with at least 12 carbon atoms and wherein at least one $x$ represents $-CH_2-y-R_1$ ($y$ being a member selected from the group consisting of oxygen and sulfur, $R_1$ being a carbon chain of at least two carbon atoms containing an acid water-solubilizing group selected from the class consisting of $-COOH$ and $-SO_3H$), a methylene bridge $-CH_2-$ replacing one $x$ of each of two atomic groupings of the formula given above and connecting in this way two atomic groupings with one another, each remaining $x$ being hydrogen.

8. A methylene compound containing at least twice the atomic grouping

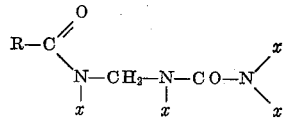

wherein

is the acyl radical of a fatty acid with at least 12 carbon atoms and wherein at least one $x$ represents

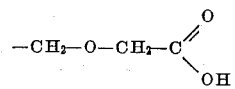

a methylene bridge $-CH_2-$ replacing one $x$ of each of two atomic groupings of the formula given above and connecting in this way two atomic groupings with one another, each remaining $x$ being hydrogen.

9. A methylene compound containing at least twice the atomic grouping

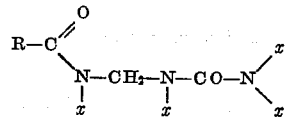

wherein

is the acyl radical of commercial stearic acid and wherein at least one $x$ represents

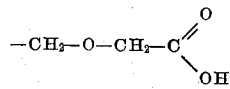

a methylene bridge $-CH_2-$ replacing one $x$ of each of two atomic groupings of the formula given above and connecting in this way two atomic groupings with one another, each remaining $x$ being hydrogen.

10. A methylene compound containing at least twice the atomic grouping

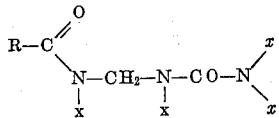

wherein

is the acyl radical of commercial stearic acid and wherein at least one $x$ represents

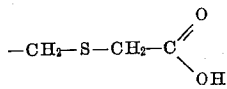

a methylene bridge —CH$_2$— replacing one $x$ of each of two atomic groupings of the formula given above and connecting in this way two atomic groupings with one another, each remaining $x$ being hydrogen.

11. A methylene compound containing at least twice the atomic grouping

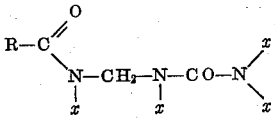

wherein

is the acyl radical of commercial stearic acid and wherein at least one $x$ represents

—CH$_2$—O—CH$_2$—CH$_2$—O—CH$_2$—CH$_2$—OH a methylene bridge —CH$_2$— replacing one $x$ of each of two atomic groupings of the formula given above and connecting in this way two atomic groupings with one another, each remaining $x$ being hydrogen.

RICHARD SALLMANN.

REFERENCES CITED

The following references are of record in the file of this patent:

UNITED STATES PATENTS

| Number | Name | Date |
|---|---|---|
| 2,279,497 | Sallmann et al. | Apr. 14, 1942 |
| 2,313,741 | Engelmann et al. | Mar. 16, 1943 |
| 2,313,742 | Engelmann et al. | Mar. 16, 1943 |
| 2,337,220 | Albrecht et al. | Dec. 2, 1943 |
| 2,338,177 | Graenacher et al. | Jan. 4, 1944 |

Certificate of Correction

Patent No. 2,487,383                                                                  November 8, 1949

RICHARD SALLMANN

It is hereby certified that errors appear in the printed specification of the above numbered patent requiring correction as follows:

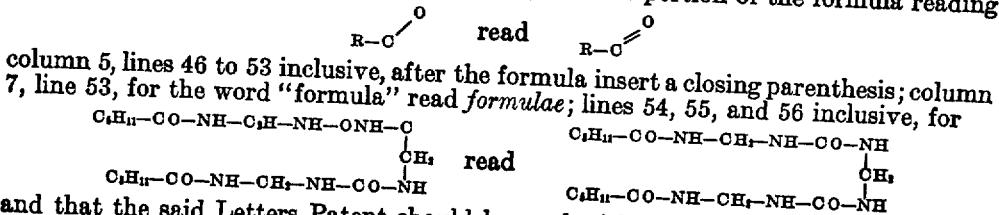

Column 4, lines 33, 34, and 35 inclusive, for that portion of the formula reading $R-C\diagup^O$ read $R-C\diagup\!\!\!\!=^O$ column 5, lines 46 to 53 inclusive, after the formula insert a closing parenthesis; column 7, line 53, for the word "formula" read *formulae*; lines 54, 55, and 56 inclusive, for $$\begin{array}{c} C_5H_{11}-CO-NH-C_2H-NH-ONH-C \\ | \\ CH_2 \\ | \\ C_5H_{11}-CO-NH-CH_2-NH-CO-NH \end{array} \quad \text{read} \quad \begin{array}{c} C_5H_{11}-CO-NH-CH_2-NH-CO-NH \\ | \\ CH_2 \\ | \\ C_5H_{11}-CO-NH-CH_2-NH-CO-NH \end{array}$$

and that the said Letters Patent should be read with these corrections therein that the same may conform to the record of the case in the Patent Office.

Signed and sealed this 14th day of March, A. D. 1950.

[SEAL]

THOMAS F. MURPHY,
                                                         *Assistant Commissioner of Patents.*